United States Patent [19]

Ohkoshi et al.

[11] 4,346,472
[45] Aug. 24, 1982

[54] METHOD AND APPARATUS FOR ELIMINATING DOUBLE BIT ERROSION IN A DIFFERENTIAL PHASE SHIFT KEYING SYSTEM

[75] Inventors: Seiei Ohkoshi; Isao Ishikawa; Teiji Okamoto, all of Yokohama; Nobuo Tsukamoto, Tachikawa, all of Japan

[73] Assignees: Hitachi, Ltd.; Nippon Telegraph & Telephone Public Corporation, both of Tokyo, Japan

[21] Appl. No.: 176,205

[22] Filed: Aug. 7, 1980

[30] Foreign Application Priority Data

Aug. 10, 1979 [JP]  Japan ................................ 54-101280

[51] Int. Cl.³ .............................................. G06F 11/10
[52] U.S. Cl. ........................................ 371/37; 371/43
[58] Field of Search ................. 371/37, 39, 40, 43; 375/57

[56] References Cited

U.S. PATENT DOCUMENTS

| | | | |
|---|---|---|---|
| 3,891,959 | 6/1975 | Tsuji et al. | 371/43 |
| 4,035,767 | 7/1977 | Chen et al. | 371/43 |
| 4,128,828 | 12/1978 | Samejima et al. | 371/43 |
| 4,211,996 | 7/1980 | Nakamura | 371/37 |

OTHER PUBLICATIONS

Forney, Jr. and Bower, A High-Speed Sequential Decoder: Proto-type Design and Test, IEEE Trans. on Comm. Tech., vol. COM-19, No. 5, Oct. 1971, pp. 821-835.

Primary Examiner—Charles E. Atkinson
Attorney, Agent, or Firm—Craig and Antonelli

[57] ABSTRACT

A code converting circuit of simple construction composed of an exclusive OR circuit and a flip-flop circuit is provided on each of transmitting and receiving sides of a digital data transmission system according to a differential phase shift keying system, to convert two consecutive errors on adjacent bits peculiar to the differential phase shift keying system into only an error on a single bit. As a result, it is not required to employ a code having an excellent error-correcting capacity in the digital data transmission system, and thus a high transmission efficiency is attained by the use of a code which is relatively deficient in error correcting capacity.

7 Claims, 3 Drawing Figures

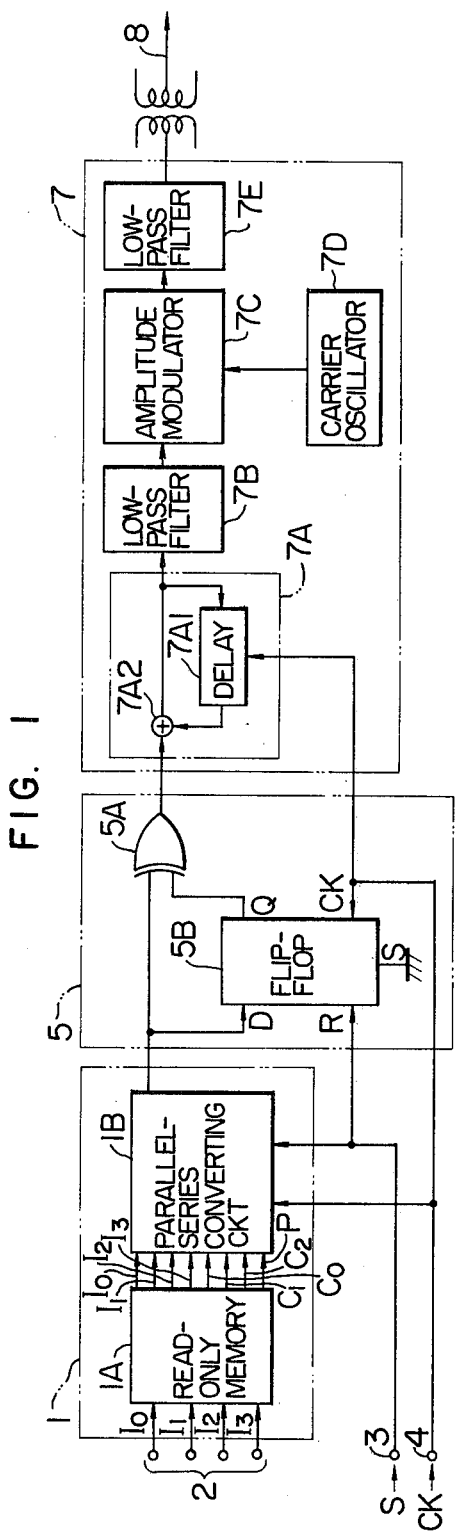
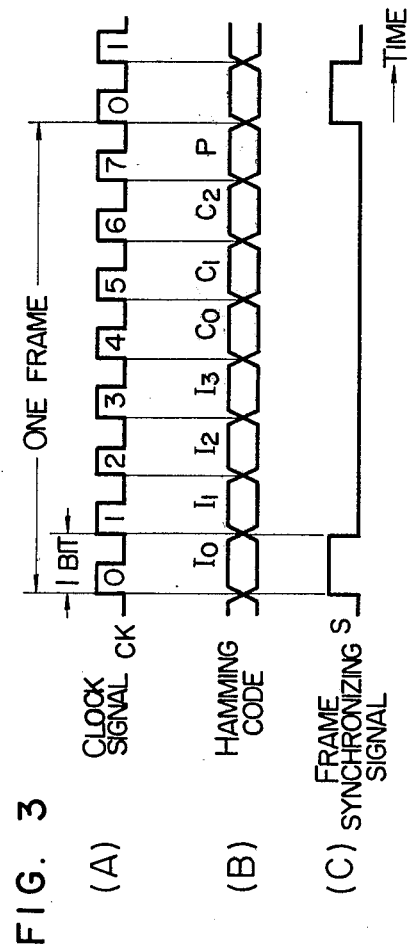

METHOD AND APPARATUS FOR ELIMINATING DOUBLE BIT ERROSION IN A DIFFERENTIAL PHASE SHIFT KEYING SYSTEM

BACKGROUND OF THE INVENTION

The present invention relates to an information coding system which is suitable for use in a digital transmission apparatus using differentially encoded coherent phase shift keying, and which can transmit a code signal (for example, a Hamming code) having a predetermined number of bits and a predetermined form, without deterioration of the error correcting capacity and the error detecting capacity peculiar to that particular code.

In a digital data transmission apparatus using differential phase shift keying, an input signal applied to a demodulator is first subjected to coherent detection, and then transmitted data is demodulated by a differential logic circuit (indicated by reference numeral 11H in FIG. 2). When the input data and output data of the differential logic circuit are identified as $\Psi_i$ and $S_i$, respectively, the differential logic circuit performs the operation given by the following equation:

$$S_i = \Psi_i + \Psi_{i-1} \quad (1)$$

where i indicates a time moment measured on a time unit necessay for shifting the input data by one bit.

Equation (1) indicates that the current input data $\Psi_i$ is added to the data $\Psi_{i-1}$ of the previous unit time to obtain the output data $S_i$. As is apparent from equation (1), when an error exists in the data $\Psi_{i-1}$, both of the output data $S_{i-1}$ and $S_i$ becomes erroneous. In other words, in a differential phase shift keying system, an error on one bit of input data results in errors in two consecutive bits of the demodulated data. Accordingly, in such a transmission apparatus as described above, for example, the Hamming code having a one-bit error correcting capacity and a two-bit error detecting capacity cannot exhibit its one-bit error correcting capacity effectively. Therefore, in conventional transmission apparatuses, a code which is more effective in error correcting capacity than the above-mentioned code, for example, a code having the two-bit error correcting capacity, has been employed. However, such a code requires a larger number of checking bits and thus becomes larger in both code length and redundancy. As a result, the transmission efficiency is lowered, and moreover the transmission apparatus becomes complicated.

Data transmission according to such a conventional differential phase shift keying system is disclosed in an article entitled "Error Statistics and Construction of Error Correcting Codes for Differentially Encoded CPSK Channels", IEEE Transactions on Information Theory, Vol. IT-24, No. 6, November 1978, pages 763 to 766.

SUMMARY OF THE INVENTION

An object of the present invention is to provide a method and an apparatus for coding information wherein a code converter of very simple construction is provided on each of the transmitting and receiving sides of a signal transmission system using differential phase shift keying in such a way that an error correcting and detecting code can perform its error correcting capacity with maximum efficiency.

Another object of the present invention is to provide a method and an apparatus for coding information wherein a high transmission efficiency is attained using a smaller number of checking bits.

An essential feature of the present invention, which attains the above objects, resides in that two consecutive errors (on adjacent bits) peculiar to a differential phase shift keying system are converted into one error (on a single bit), by providing a code converter of very simple construction on each of the transmitting and receiving sides of a digital data transmission system using differential phase shift keying. Thus, according to the present invention, the use of a code which is excellent in error correcting capacity, for example, an error correcting code which has a two-bit error correcting capacity and therefore exhibits a high degree of redundancy, is not required, but an error correcting code which is relatively less efficient in error correcting capacity and therefore is able to correct only a one-bit error, can be used. Since the code which is less efficient in error correcting capacity also exhibits a lower degree of redundancy, the use of such a code can improve the transmission efficiency, make the construction of the transmission apparatus simple, enhance the reliability of the signal transmission system, and make the transmission apparatus inexpensive.

BRIEF DESCRIPTION OF THE DRAWINGS

FIG. 1 is a block diagram showing the transmitting side of an embodiment of an information coding apparatus according to the present invention.

FIG. 3 is a waveform chart of signals for explaining th operation of the embodiment shown in FIGS. 1 and 2.

DESCRIPTION OF THE PREFERRED EMBODIMENTS

Figure 2:
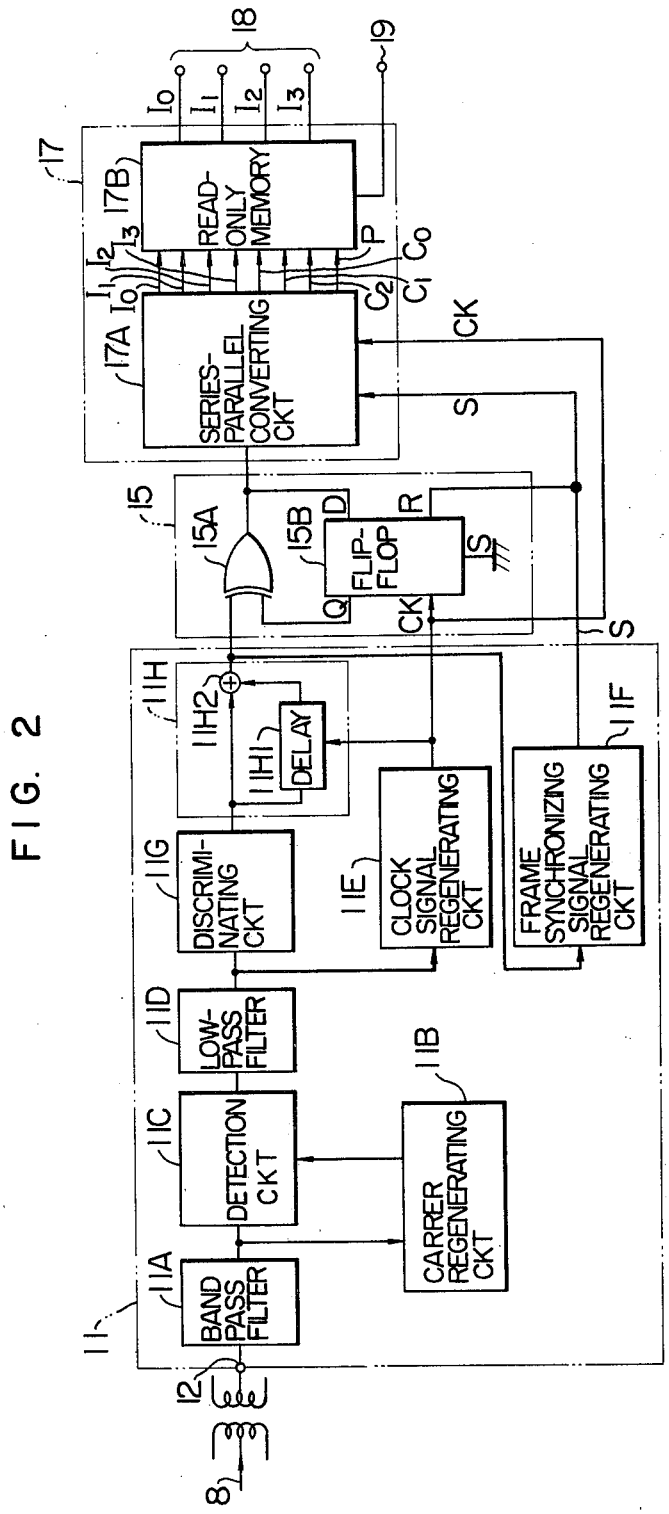
FIG. 2 is a block diagram showing the receiving side of the above-mentioned embodiment.

FIGS. 1 and 2 illustrate an embodiment of an information coding apparatus according to the present invention, and show the transmitting and receiving parts of the embodiment, respectively. In the embodiment, a Hamming code having eight bits is used as an error correcting code. In more detail, the Hamming code, as is indicated by reference character (B) in FIG. 3, includes information (or data) bits composed of four bits $I_0$ to $I_3$, Hamming check bits composed of three bits $C_0$ to $C_2$, and a parity bit P made of a single bit, in the order described.

Referring to FIG. 1, an information code made up of four bits is applied through an input terminal 2 to a circuit for generating an error correcting code, namely, a Hamming code generating circuit 1, to be converted into the Hamming code having eight bits in the above-mentioned form. The Hamming code generating circuit 1 is well known, and includes a read-only memory (ROM) 1A which employs the inputted information code as an address signal to obtain the Hamming code, and a parallel-series coverting circuit 1B. The Hamming code outputted from the circuit 1 is applied to a code converting circuit 5 composed of an exclusive OR circuit 5A and a flip-flop circuit 5B, and is subjected to code conversion through an arithmetic operation of the transfer function $1+x^{-1}$ by the code converting circuit 5. The arithmetic operation produces the modulo 2 sum of a current input bit (1) and an immediately preceding input bit $(x^{-1})$, in positive logic. The above-mentioned modulo 2 sum in positive logic is produced by the operation of the exclusive OR circuit 5A. The modulo 2 sum is the same as an exclusive OR operation.

The above arithmetic operation is performed in such a manner that the code converting circuit 5 is reset by a frame synchronizing signal S, which is indicated by reference character (C) in FIG. 3 and applied to a synchronizing input terminal 3 at intervals of eight bits. The code thus produced is applied to a modulator 7 operating according to the differential phase shift keying system so as to be subjected to such modulation, and then is applied to a transmission line 8. The modulator 7 is well known, and incudes a differential logic circuit 7A made up of a delaying circuit 7A1 for delaying an inputted code by one bit and an adder 7A2, a low-pass filter 7B for filtering the output of the differential logic circuit 7A, an amplitude modulator 7C and an carrier oscillator 7D for generating an amplitude-modulated signal on the basis of the output of the low-pass filter 7B, and a band-pass filter 7E for filtering the amplitude-modulated signal. Reference numeral 4 denotes an input terminal, to which is applied a clock signal CK such as indicated by reference character (A) in FIG. 3, the terminal H also being connected to a clock input terminal CK of the flip-flop circuit 5B. Terminals D, Q, R, CK, and S of the flip-flop circuit 5B denote input, output, reset, clock input, and set terminals of the circuit 5B, respectively. Incidentally, the frame synchronizing signal S and the clock signal CK applied respectively to the terminals 3 and 4 are both generated in a well-known manner. The transmission line 8 is not restricted to a wire transmission link, but a radio transmission line may be employed as well.

Referring now to FIG. 2, the modulated signal on the transmission line 8 is supplied through an input terminal 12 to a demodulator 11 operating according to the differential phase shift keying system, in which the modulated signal is demodulated to be converted into binary data. The demodulator 11 is well known, and includes a band-pass filter 11A, a carrier regenerating circuit 11B, a detection circuit 11C, a low-pass filter 11D, a clock signal regenerating circuit 11E, a frame synchronizing signal regenerating circuit 11F, a discriminating circuit 11G, and a differential logic circuit 11H made up of a delaying circuit 11H1 for delaying inputted data by one bit and an adder 11H2.

The binary data outputted from the demodulator 11 is applied to a code converting circuit 15 on the receiving side made up of an exclusive OR circuit 15A and a flip-flop circuit 15B, and is subjected to an arithmetic operation of the transfer function $(1)/(1+x^{-1})$ by the code converting circuit 15. The above arithmetic operation provides the modulo 2 sum of the current output bit outputted from the circuit 11G and the immediately preceding bit, and is performed in such a manner that the circuit 15 is reset by the frame synchronizing signal S which is indicated by reference character (C) in FIG. 3 and regenerated by the frame synchronizing signal regenerating circuit 11F. The binary data or code thus produced is applied to a Hamming code decoding circuit 17, in which the error correction peculiar to the Hamming code having eight bits is conducted. The Hamming code decoding circuit 17 is well known, and includes a series-parallel converting circuit 17A and a read-only memory (ROM) 17B applied with the digit of each bit in parallel for delivering decoded data 18 and a two-bit error detecting signal 19.

Now, explanation will be made in detail on the operation of the code converting circuit 5 which is provided on the transmitting side and is made up of the exclusive OR circuit 5A and the flip-flop circuit 5B, and of the code converting circuit 15 which is provided on the receiving side and is made up of the exclusive OR circuit 15A and the flip-flop circuit 15B, which code converting circuits 5 and 15 are the essence of the present invention.

The exclusive OR circuit 5A and the flip-flop circuit 5B perform the previously-mentioned operation $1+x^{-1}$ while being reset at intervals of eight bits. In more detail, in a case where, for example, a Hamming code ($^{LSB}$1 0 1 1 0 1 0) is applied to the code converting circuit 5 in the order from the least significant bit to the most significant bit, a code ($^{LSB}$1 0 1 1 0 1 1 1) is outputted from the circuit 5. In the above operation, the digit of the first bit of the inputted Hamming code is always equal to that of the first bit of outputted code. Further, the exclusive OR circuit 15A and the flip-flop circuit 15B perform the previously-mentioned operation $(1)/(1+x^{-1})$ while being reset at intervals of eight bits. That is, in a case where, for example, the code ($^{LSB}$1 0 1 1 0 1 1 1) is applied from the demodulator 11 to the code converting circuit 15 in the above-mentioned order, the code ($^{LSB}$1 1 0 1 1 0 1 0) is outputted from the circuit 15. In this operation, the digit of the first bit of inputted code and that of the first bit of outputted code are equal to each other. As is evident from the above example, in a case where the transmitted signal is not affected by noise or the like, namely, no error is produced on each bit of the transmitted code, the transmitted code agrees with the received code.

Next, explanation will be made on a case where the transmitted signal is affected by noise or the like and thus a single error is produced. In a case where, for example, the previously-mentioned Hamming code ($^{LSB}$1 1 0 1 1 0 1 0) is outputted from the Hamming code generating circuit 1, the outputted code is converted into the code ($^{LSB}$1 0 1 1 0 1 1 1) by the code converting circuit 5 according to the present invention, as has been explained above. The code outputted from the circuit 5 is converted into the code ($^{LSB}$1 1 0 1 1 0 1 0) by the differential logic circuit 7A incorporated in the modulator 7 according to the differential phase shift keying system, and then used to conduct amplitude modulation for a suppressed carrier signal. The signal thus modulated is applied to the transmission line 8. Now, let us consider a case where a single error has occurred in the transmitted signal due to noise on the transmission line 8, or the like and thus an input ($^{LSB}$1 1 1 1 0 1 0) is applied to the demodulator 11 which is then subjected to differential phase shift keying demodulation. That is, let us assume that an error has occurred in the third bit (from the least significant bit) of the transmitted signal. The received signal is subjected to code conversion in the differential logic circuit 11H incorporated in the demodulator 11. Thus, a code ($^{LSB}$1 0 0 0 0 1 1 1) is outputted from the demodulator 11. Since the above code should be equal to the previously-mentioned code ($^{LSB}$1 0 1 1 0 1 1 1) when no error has occurred in the transmitted signal, the third and fourth bits (from the least significant bit) of the code ($^{LSB}$1 0 0 0 0 1 1 1) are erroneous in succession. The Hamming code, which has a one-bit error correcting capacity and the two-bit error detecting capacity, cannot correct the above-mentioned two consecutive errors in most cases, though such errors can be detected.

The code having two consecutive errors, however, is converted into the code ($^{LSB}$1 1 1 1 1 0 1 0) by the code converting circuit 15 made up of the exclusive OR circuit 15A and the flip-flop circuit 15B. That is, the last code is erroneous only in the third bit thereof as compared with the transmitted code ($^{LSB}$1 0 1 1 0 1 0). The single error as above can be corrected by a Hamming code correcting operation according to a predetermined form which operation is performed in the Hamming code decoding circuit 17.

As is apparent from the foregoing explanation, according to the present invention, two consecutive errors in adjacent bits peculiar to the differential phase shift keying system can be converted into a single error by providing a simple circuit on each of the transmitting and receiving sides of a signal transmission system. Accordingly, a code capable of correcting only the error on a single bit is effectively employed, and therefore the transmission efficiency can be improved. Further, since the code converting circuits per se according to the present invention are very simple in circuit construction, the reliability of the signal transmission system is high and moreover the code converting circuits are low in cost.

We claim:

1. An information coding method usable in a digital data transmission system for transmitting digital data in frames containing n bits with each frame including error correcting code bits and information bits modulated by differential phase shift keying, comprising the steps of:

forming for each frame of digital data an individual code for transmission in such a manner that a first transmitted bit of said code for transmission is made equal to a first bit of said error correcting code and an i-th transmitted bit ($2 \leq i \leq n$) of said code for transmission is formed by a modulo 2 sum of the i-th and (i−1)th bits of said error correcting code;

modulating said code for transmission by differential phase shift keying;

transmitting said modulated code;

demodulating said transmitted code by differential phase shift keying;

forming a demodulated error correcting code from said demodulated transmitted code in such a manner that the first bit of said demodulated error correcting code is made equal to the first bit of said demodulated transmitted code and an i-th bit of said demodulated error correcting code is formed by a modulo 2 sum of an i-th bit of said demodulated transmitted code and an (1−1)th bit of said demodulated error correcting code; and performing an error correcting operation on said demodulated error correcting code to regenerate said information code, said error correcting operation being peculiar to said error correcting code having said code length of n bits.

2. An information coding system according to claim 1, wherein said step of forming said code for transmission includes a step of forming an exclusive OR between a current input bit of said error correcting code and an immediately preceding input bit.

3. An information coding system according to claim 1, wherein said step of forming said demodulated error correcting code includes a step of forming an exclusive OR between a current output bit of said code for transmission having been been demodulated and an immediately preceding generated bit.

4. An information coding system according to claim 1, wherein each of said steps of forming said code for transmission and of forming said demodulated error correcting code is taken at an interval of one frame equal to said code length of n bits.

5. In a system for transmitting digital data in frames containing n bits with each frame including error correcting code bits and information bits modulated by, including an error correcting code generating circuit for generating an error correcting code from information codes, a differential phase shift keying circuit for modulating said error correcting code for transmission, a demodulating circuit for demodulating said modulated error correcting code, and an error correcting code decoding circuit for decoding said error correcting code, the improvement comprising:

first means for code conversion provided between said error correcting code generating circuit and said different phase shift keying circuit, including a first exclusive OR circuit and a first flip-flop circuit, to convert each frame of said error correcting code individually in such a manner that the first bit of a converted code is made equal to the first bit of said error correcting code and an i-th bit ($2 \leq i \leq n$) of said converted code is formed by a modula 2 sum of (i−1)th and i-th bits of said error correcting code; and second means for code conversion provided between said demodulating circuit and said error correcting code decoding circuit, including a second exclusive OR circuit and a second flip-flop circuit, to conduct code conversion at an interval of one frame in such a manner that the first bit of a converted code is made equal to the first bit of a demodulated transmitted code and an i-th bit ($2 \leq i \leq n$) of said converted code is formed by a modula 2 sum of an (i−1)th bit of said demodulated transmitted code and an (i−1)th bit of said converted code.

6. An apparatus for coding information according to claim 5, wherein one input of said first exclusive OR circuit is connected to the output of said error correcting code generating circuit and an output terminal of said first exclusive OR circuit is connected to the input of said differential phase shift keying circuit, and wherein input and output terminals of said first flip-flop circuit are connected to the output of said error correcting code generating circuit and the other input of said first exclusive OR circuit, respectively, and reset and clock input terminals of said first flip-flop circuit are connected to receive a frame synchronizing signal and a clock signal, respectively.

7. An apparatus for coding information according to claims 5 or 6, wherein one input of said second exlusive OR circuit is connected to the output of said demodulating circuit and an output of said second exclusive OR circuit is connected to the input of said error correcting code decoding circuit, and wherein input and output terminals of said second flip-flop circuit are connected to the output and the other input of said second exclusive OR circuit, respectively, and reset and clock input terminals of said second flip-flop circuit are connected to receive a frame synchronizing signal and a clock signal, respectively.

* * * * *